(12) United States Patent
Sarhan

(10) Patent No.: US 10,124,658 B2
(45) Date of Patent: Nov. 13, 2018

(54) VEHICLE RESCUE SYSTEM

(71) Applicant: KING ABDULLAH UNIVERSITY OF SCIENCE AND TECHNOLOGY, Thuwal (SA)

(72) Inventor: Sami Ibrahim Sarhan, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/674,805

(22) Filed: Aug. 11, 2017

(65) Prior Publication Data

US 2018/0043760 A1 Feb. 15, 2018

Related U.S. Application Data

(60) Provisional application No. 62/375,128, filed on Aug. 15, 2016.

(51) Int. Cl.
| | | |
|---|---|---|
| *B63B 35/58* | (2006.01) | |
| *B60J 11/00* | (2006.01) | |
| *B63B 7/08* | (2006.01) | |
| *B60J 11/04* | (2006.01) | |

(52) U.S. Cl.
CPC ............... *B60J 11/00* (2013.01); *B63B 7/08* (2013.01); *B63B 35/58* (2013.01); *B60J 11/04* (2013.01)

(58) Field of Classification Search
CPC . B60J 11/00; B63B 7/08; B63B 35/58; B63B 43/14; B63B 43/10
See application file for complete search history.

(56) References Cited

U.S. PATENT DOCUMENTS

| | | | | | |
|---|---|---|---|---|---|
| 2,924,192 | A * | 2/1960 | Salvage | ............... | B63B 43/14 114/345 |
| 3,710,409 | A * | 1/1973 | Hakki | ............... | B60R 21/16 280/375 |
| 4,495,880 | A * | 1/1985 | Maniscalco | ............ | B63B 35/42 114/123 |
| 4,817,555 | A * | 4/1989 | Meinen | ............... | B63B 43/14 114/219 |
| 4,864,961 | A * | 9/1989 | Slonski | ............... | B63B 43/14 114/360 |
| 4,945,851 | A * | 8/1990 | Buckle | ............... | B63B 7/08 114/333 |
| 5,150,662 | A * | 9/1992 | Boyd | ............... | B62M 27/02 114/68 |
| 5,215,031 | A * | 6/1993 | Inman | ............... | B63B 59/02 114/219 |
| 5,357,888 | A * | 10/1994 | Insinna | ............... | B63B 43/14 114/219 |
| 6,070,546 | A * | 6/2000 | Downey | ............... | B63B 43/14 114/123 |

(Continued)

*Primary Examiner* — Lars A Olson
*Assistant Examiner* — Jovon E Hayes
(74) *Attorney, Agent, or Firm* — Patent Portfolio Builders PLLC

(57) ABSTRACT

Disclosed are various embodiment of a vehicle rescue system. The vehicle rescue system may include a gas chamber that is attached to a vehicle, the gas chamber comprising an enclosed cavity; a gas tube that is connected to the gas chamber, the gas tube being filled with a gas; and an inflation control module attached to the gas chamber, the inflation control module being configured to control a release of the gas from the gas tube into the gas chamber, wherein releasing the gas inflates the gas chamber.

20 Claims, 16 Drawing Sheets

(56) References Cited

U.S. PATENT DOCUMENTS

| | | | | |
|---|---|---|---|---|
| 6,321,678 B1 * | 11/2001 | Skulnick | ............... | B63B 23/66 114/381 |
| 6,595,359 B1 * | 7/2003 | Allain | ............... | B60J 11/00 206/335 |
| 6,798,346 B2 * | 9/2004 | Kim | ............... | B60R 21/00 340/426.36 |
| 6,802,274 B2 * | 10/2004 | Mears | ............... | B63B 43/14 114/123 |
| 6,845,726 B2 * | 1/2005 | Mears | ............... | B63B 43/14 114/123 |
| 7,069,873 B2 * | 7/2006 | Seidel | ............... | B63B 43/14 114/360 |
| 7,287,482 B1 * | 10/2007 | Banchetto | ............... | B63B 43/14 114/123 |
| 7,421,963 B1 * | 9/2008 | Victor | ............... | B63C 1/00 114/45 |
| 7,523,713 B2 * | 4/2009 | Farris | ............... | B63B 43/12 114/68 |
| 7,587,482 B2 * | 9/2009 | Henderson | ............... | G06F 3/0481 709/223 |
| 8,695,521 B2 * | 4/2014 | Dondurur | ............... | B60R 21/00 114/123 |
| 9,290,144 B1 * | 3/2016 | Cox | ............... | B60R 21/01 |
| 2006/0043712 A1 * | 3/2006 | Hakki et al. | ............... | B63C 9/00 441/6 |
| 2008/0243342 A1 * | 10/2008 | Breed | ............... | B60R 21/0132 701/45 |
| 2009/0242697 A1 * | 10/2009 | Schmidt | ............... | B60F 3/0038 244/106 |
| 2009/0325433 A1 * | 12/2009 | Blacklock | ............... | B63B 7/08 441/41 |

* cited by examiner

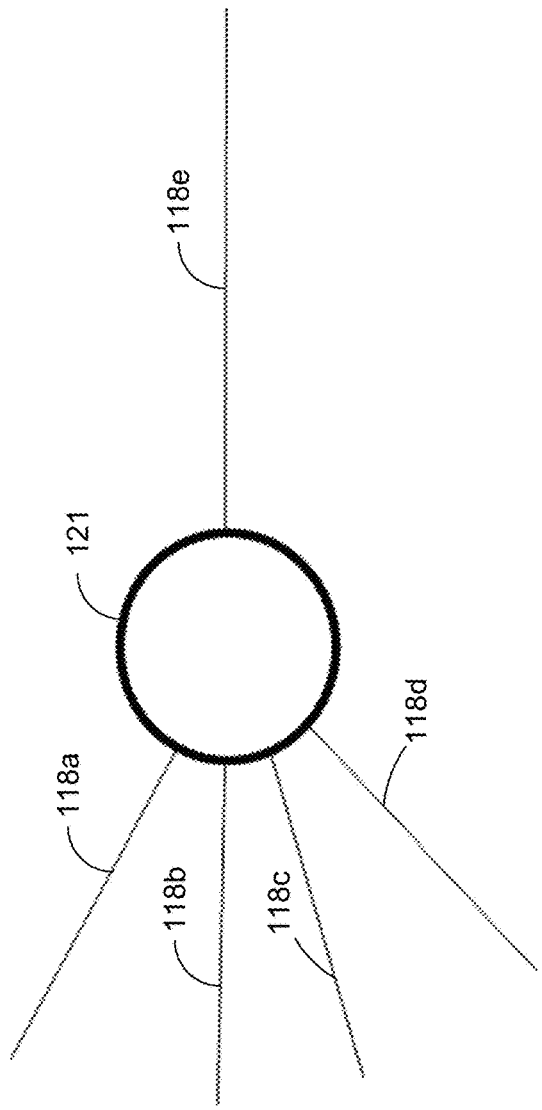

Front View

VEHICLE RESCUE SYSTEM

CROSS-REFERENCE TO RELATED APPLICATIONS

This application claims priority to U.S. Provisional Application titled, "Vehicle Rescue System", having Ser. No. 62/375,128, filed Aug. 15, 2016, which is entirely incorporated herein by reference.

BACKGROUND

Property damage from any flood comes at a high cost. Each year floods cause over a billion dollars in property damage. Vehicle damage is one of the most common forms of property damage experienced from a flood. In many cases, vehicles are totaled because of severe damage caused to the interior and exterior.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1B through 1D are drawings of an example of an anchor vehicle rescue system (VRS), according to various embodiments of the present disclosure.

DETAIL DESCRIPTION

Disclosed herein are various embodiments of methods and systems related to enabling a vehicle to float in preparation for a flood or during flooding conditions. The various embodiments of the present disclosure comprise multiple inflatable modules that can be attached to different locations on a vehicle. For example, an inflatable module may be positioned at the front, at the rear, along the sides, and around the tires of the vehicle. In some embodiments, the inflatable modules can be connected to each other to collectively form a vehicle rescue system. For example, the individual inflatable modules can be attached to each other to form a ring underneath and/or along the lower perimeter of the vehicle. During a flood, once the water level reaches a predefined height along the vehicle, the water can trigger a sensor that transmits an activation signal. In response to the activation signal, the vehicle rescue system can release a gas, such as air or carbon dioxide, into each of the inflatable modules, which enables the vehicle to float in the water.

The present disclosure of the various embodiments has several advantages. For example, a vehicle rescue system can prevent water from entering a passenger compartment, an engine compartment and other areas during a flood because the vehicle is elevated by the inflatable modules to an appropriate height. Thus, the water cannot flow into various vulnerable areas of a vehicle. In addition, the inflatable modules can operate as a protective shell that surrounds the exterior of the vehicle. This feature can protect the vehicle from damage during situations where strong water currents are susceptible to moving debris or the vehicle itself. In other situations, the vehicle rescue system can be configured with an anchor system to prevent the flood water from substantially moving the vehicle. In addition, as a result of the design, extra parts are not required for installing various embodiments of the present disclosure. Depending on the vehicle type and size, the vehicle rescue system can be installed on a majority of currently available vehicles without any additional parts.

In the following paragraphs, the embodiments are described in further detail by way of example with reference to the attached drawings. In the description, well known components, methods, and/or processing techniques are omitted or briefly described so as not to obscure the embodiments. Turning now to the drawings, a general description of exemplary embodiments of a vehicle rescue system and its components are provided, followed by a discussion of the operation of the system.

Figure 1A:
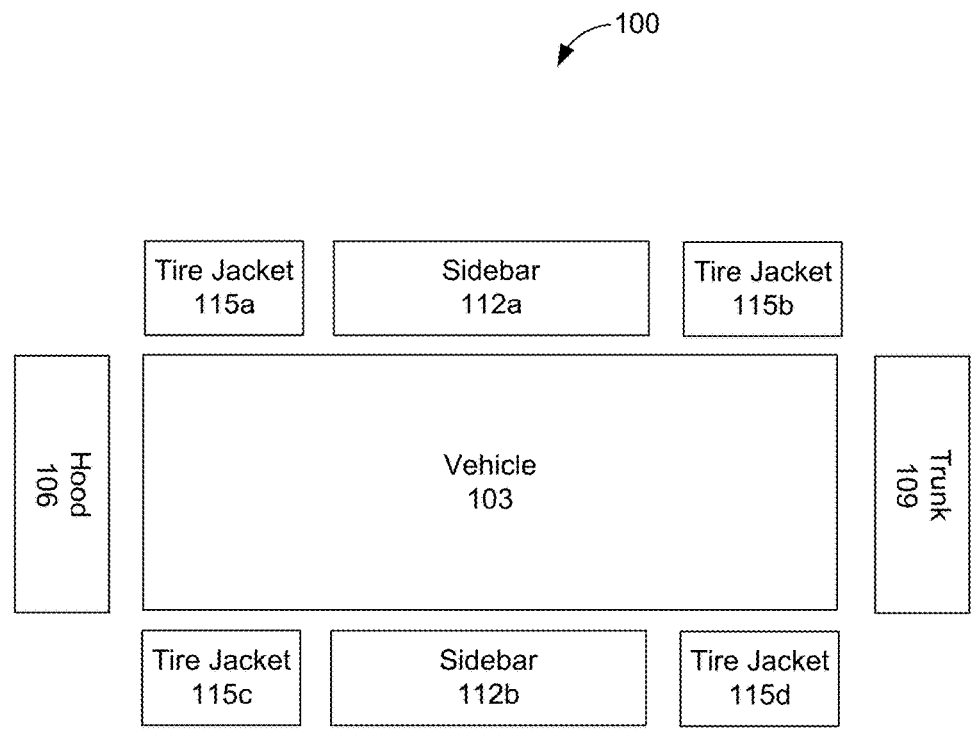
FIG. 1A is a block diagram illustrating an example of a vehicle rescue system, according to various embodiments of the present disclosure.

With reference to FIG. 1A, shown is a block diagram illustrating an example of a vehicle rescue system 100 attached to a vehicle 103. The vehicle rescue system 100 can comprise multiple inflatable modules. Specifically, the vehicle rescue system 100 can include a hood vehicle rescue system (VRS) 106, a trunk VRS 109, multiple sidebar VRS 112a and 112b, and multiple tire jacket VRS 115a-115d. These VRS can be referred to collectively as inflatable modules. The hood VRS 106 can be attached to a front portion of the vehicle 103, such as a car grill or a front bumper. In some embodiments, the hood VRS 106 can be attached to the front portion of the vehicle 103 via a magnet, a snap-hook strap, or other appropriate fastening apparatus. The trunk VRS 109 can be attached to a rear portion of the vehicle 103, such as a rear bumper. In some embodiments, the trunk VRS 106 can be attached to the rear portion of the vehicle 103 via a magnet, a snap-hook strap, or other appropriate fastening apparatus. In addition, each sidebar VRS 112 can be attached to a side portion of the vehicle 103 via a magnet, a snap-hook strap, or other appropriate fastening apparatus. Further, each tire jacket VRS 115 can be attached to an axle of the vehicle 103 or other suitable locations substantially near a tire of the vehicle 103.

Figure 1C:
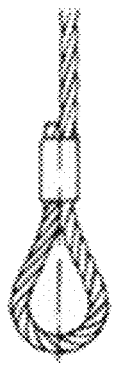
Figure 1D:
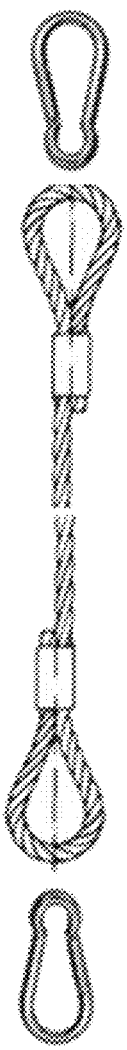

Turning now to FIGS. 1B through 1D, shown are various portions of an example of an anchor VRS. Specifically, FIG. 1B illustrates a drawing of a steel ring attached to multiple steel ropes. In addition, FIG. 1C illustrates a drawing of a swaged eye, and FIG. 1D illustrates a drawing of snap hooks attached to swaged eyes.

Referring between FIGS. 1B through 1D, the anchor VRS can comprise of five steel ropes 118a-118e that are attached to a steel ring 121. Each end of a steel rope 118 can be configured in a swaged eye, as shown in FIG. 1C. Also, each of the swaged eyes can be connected to a snap hook from both side, as shown in FIG. 1D. Four of the steel ropes 118a-118d will be anchored to the car at various locations. One of the locations could be any of the VRS modules, a portion of the structure of the vehicle 103 itself, or other suitable locations. The one steel rope 118e can anchor the vehicle 103 to any solid structure or a strong pole. The anchor VRS module can be used separately such that it does not require any of the other VRS modules. The one steel rope 118e can 50% longer than the other four steel ropes 118a-118d since it will be anchored to hold the vehicle 103. In another embodiment, among others, the anchor VRS, upon activation, can release an anchor to assist with stabilizing the vehicle 103.

Figure 1E:
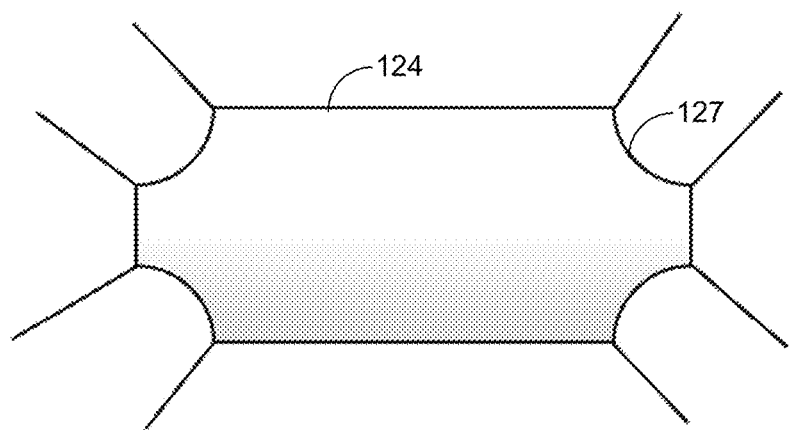
FIGS. 1E and 1F are drawings of an example of a protection sheet VRS, according to various embodiments of the present disclosure.
Figure 1F:

Turning now to FIGS. 1E and 1F, shown are various portions of an example of a protection sheet VRS. When deployed, the protection sheet VRS can protect the underside of the car. FIG. 1E illustrates a drawing of a protection sheet 124. In addition, FIG. 1F illustrates a drawing of an example of a nylon rope attached to a snap hook. The protection sheet VRS can be part of the VRS system 100 and can be used separately without any of the other VRS modules. However, if used with the rest of the VRS modules, the protection sheet VRS will add extra protection to the vehicle 103. The protection sheet VRS can comprise a protection sheet 124 and the protection sheet 124 can be made of nylon and have eight ropes along the corners as shown in FIG. 1E. The shape of the protection sheet can be a plaque and flexible. This shape can enable the user to easily deploy it under the vehicle. Each curve corner 127 will allow the protection sheet 124 to go around the four tires of the vehicle 103. Each of the ropes are ended with a snap hook, as shown in FIG. 1F, that will be anchored to an appropriate part under the vehicle 103 or to other VRS modules (i.e. Tire Jacket). The length of each of the ropes can be equal and flexible. The protection sheet 124 can be placed under the vehicle to protect the lower part of a vehicle hoods (e.g. engine compartment), lower parts of the passenger compartments, and lower part of trunk.

Next, each of the inflatable modules can comprise an inflation control module (FIGS. 2 and 3) that controls the release of a gas contained in one or more gas tubes. The gas can be released into an inflatable gas chamber (FIGS. 2 and 3) that inflates to provide buoyancy that can elevate a portion of the vehicle away from the ground and the water. Each inflatable gas chamber can be divided into chamber cells such as, e.g., an outer cell, a middle cell, and an inner cell. Each of the chamber cells can be completely isolated from each other but attached to each other. Each of the chamber cells can have its own mechanical corridor to allow the gas to enter and inflate the cell. One reason for this isolation is in the case of any of the chamber cells getting poked or experiencing a malfunction, the other chamber cells will still hold enough gas to uplift the vehicle. In addition, the inflation control module can sense the pressure in each cell and control the release of gas to any or all of the cells appropriately. In some embodiments, the inflation control modules associated with each inflatable module can be in data communication with each other via a wired or wireless communication channel. As such, the inflation control modules can release the gas from their respective gas tubes in a coordinated manner. For example, the inflated modules can be inflated in a sequence or at substantially the same time.

Figure 2A:
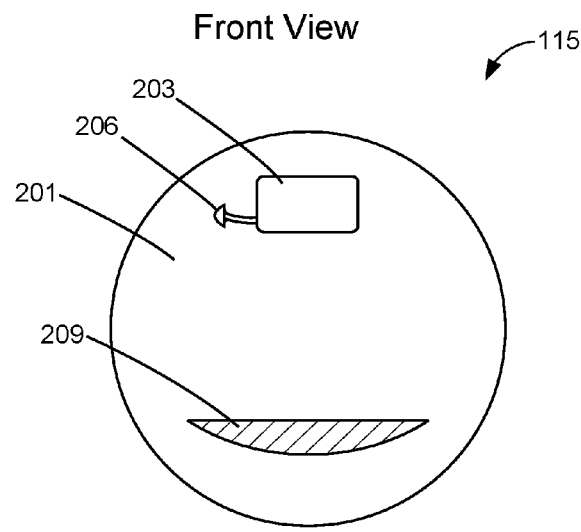
FIGS. 2A and 2B illustrate a front and back view of a tire jacket VRS, according to various embodiments of the present disclosure.
Figure 2B:
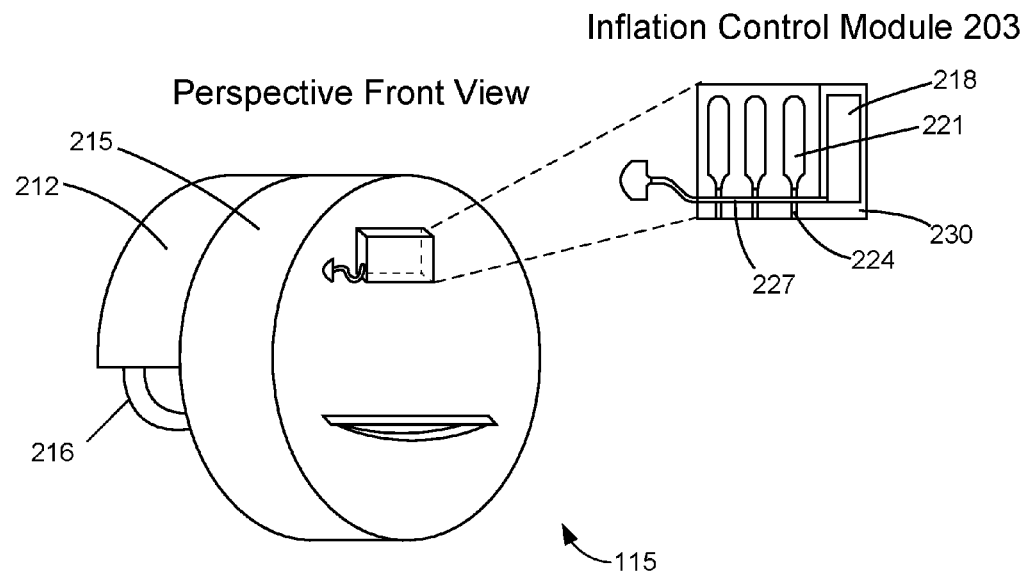

Turning now to FIG. 2A, shown is a front view of the tire jacket VRS 115 illustrated in FIG. 1A. The illustrated embodiment illustrates a front side 201 of a tire jacket gas chamber (FIG. 2B). The tire jacket VRS 115 can include an inflation control module 203, a manual gas release latch 206, and an extended gas chamber 209. FIG. 2B shows a perspective front view of the tire jacket VRS 115 illustrated in FIG. 2A. FIG. 2B further illustrates that the tire jacket VRS 115 can also include a tire jacket 212, a tire jacket gas chamber 215, and a snap-hook strap 216. In addition, the inflation control modules 203 also include a control board 218, a gas tube 221, a gas corridor 224, a mechanical corridor 227, and an inflation control module enclosure 230.

Referring between FIGS. 2A and 2B, in one embodiment, the tire jacket VRS 115 can have a circular shape. The inflation control module 203 can be attached to an exterior surface of the front side 201. In other implementations, the inflation control module 203 can be embedded within the front side 201. The inflation control module 203 can be used to control the release of the gas from the gas tubes 221 into the tire jacket gas chamber 215. The inflation control module 203 can be programmed to release the gas upon receiving an activation signal from a sensor or a command from a client device (e.g. a mobile application executing on a smartphone). In other embodiments, the user can manually trigger the inflation control module 203 to release the gas into the tire jacket gas chamber 215 via a gas inflation latch. The extended gas chamber 209 can be a secondary gas chamber, which can be used to increase the buoyancy of the vehicle 103.

Further, the perspective view of FIG. 2B illustrates that the tire jacket 212 can be attached to the tire jacket gas chamber 215. In particular, these components can be attached in such a way that a portion of their respective perimeters are in alignment with each other. The tire jacket 212 can also be attached to the snap-hook strap 216, which can be used to wrap around an axle of the vehicle 103.

Additionally, the control board 218 may comprise various electronic components such as a processor, a communications transceiver, a global positioning system (GPS) receiver, a battery, a memory, and other suitable electronic components. The communications transceiver can include a wireless transceiver that can provide wireless communications (e.g. Bluetooth, Wi-Fi, cellular data, etc.) over a standards-based protocol or a propriety protocol. The control board 218 via the communications transceiver and the processor can be in data communication with one or multiple water level detection sensors. The water level detection sensors can be positioned on the tire jacket VRS 115 itself or at some other location on the vehicle 103. The water level threshold can be set to a height that prevents water entering the engine compartment and/or the passenger compartment.

In other words, the water level threshold can be set to a water level that still provides enough time for the tire jacket VRS 115 and the other inflatable modules to be inflated before the water can enter various compartments of the vehicle 103.

With respect to the inflation control module 203, multiple gas tubes 221 can be positioned in a parallel arrangement. In some embodiments, the inflation control modules 203 can contain between three to five gas tubes 221. Each gas tube 221 can be connected to a gas corridor 224, and in turn, the gas corridor 224 can be connected to the tire jacket gas chamber 215 via a port opening. The control board 218 can be electrically coupled and/or mechanically coupled to the gas tubes 221. In addition, the control board 218 can be used to initiate breaking a seal associated with the gas tubes 221 that present the gas tubes 221 from releasing the gas into the tire jacket gas chamber 215. Further, the mechanical corridor 227 can be connected to the gas corridor 224 and can be used to release gas from the tire jacket gas chamber 215 into the atmosphere. In other words, the mechanical corridor 227 can be used to deflate the tire jacket gas chamber 215 after inflation. In addition, the inflation control module enclosure 230 can be configured to water proof its components (e.g. the gas tubes 221, the control board 218, the gas corridor 24, etc.). In some embodiments, the mechanical corridor 227 can be used to manually inflate the VRS. It can be used in the case if any or all of the gas tube are not working or are not providing enough gas to inflate the VRS. The mechanical corridor 227 can be protected with a strong nozzle that will allow the gas to enter but not leave the chamber without manual intervention.

Figure 2C:
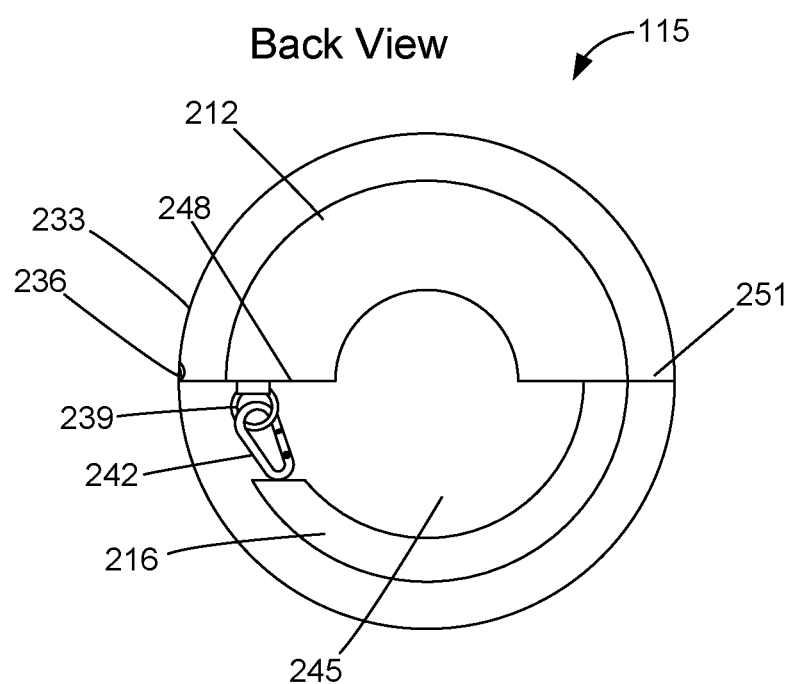
FIGS. 2C and 2D illustrate a perspective front view and a perspective back view of the tire jacket VRS, according to various embodiments of the present disclosure.

Turning now to FIG. 2C, shown is a back view of the tire jacket VRS 115 illustrated in FIG. 1A. FIG. 2C illustrates that the tire jacket 212 can also include a jacket zipper 233 and a zipper snap 236. In addition, the tire jacket VRS 115 can include a ring 239, a snap-hook 242, and a tire chamber 245. In addition, FIG. 2D shows a perspective back view of the tire jacket VRS 115.

Figure 2D:
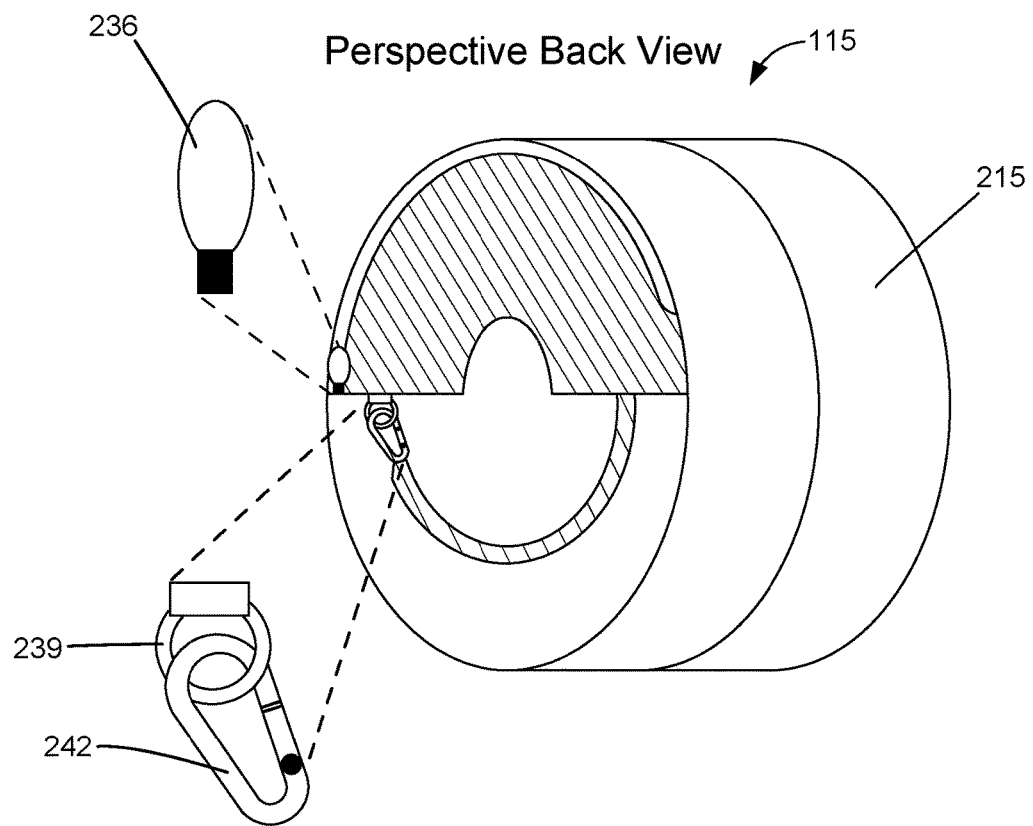

Referring between FIGS. 2C and 2D, in one embodiment, the jacket zipper 233 can be positioned along a portion of a perimeter of the tire jacket 212. The jacket zipper 233 can include a path of a pair of zipper tracks used to open and close the tire jacket 212. The zipper snap 236 is mechanically coupled to the zipper tracks of the jacket zipper 233. The zipper snap 236 can mechanically attach and unattach the zipper tracks by a user pulling the zipper snap 236 along the path of the jacket zipper 233. The tire jacket 212 can comprise a first end 248 and a second end 251. At the first end 248, the tire jacket 212 can be attached to the ring 239, and at the second end 251, the tire jacket 212 can be attached to one end of the snap-hook strap 216. The other end of the snap-hook strap 216 can comprise the snap-hook 242. During an installation, the snap-hook strap 216 can be wrapped around an axle of the vehicle 103 and attached to the ring 239 via the snap hook 242. In one embodiment, the tire chamber 245 is a cavity used to contain a tire of the vehicle 103 while the snap-hook strap 216 is wrapped around the vehicle axle.

Figure 3A:
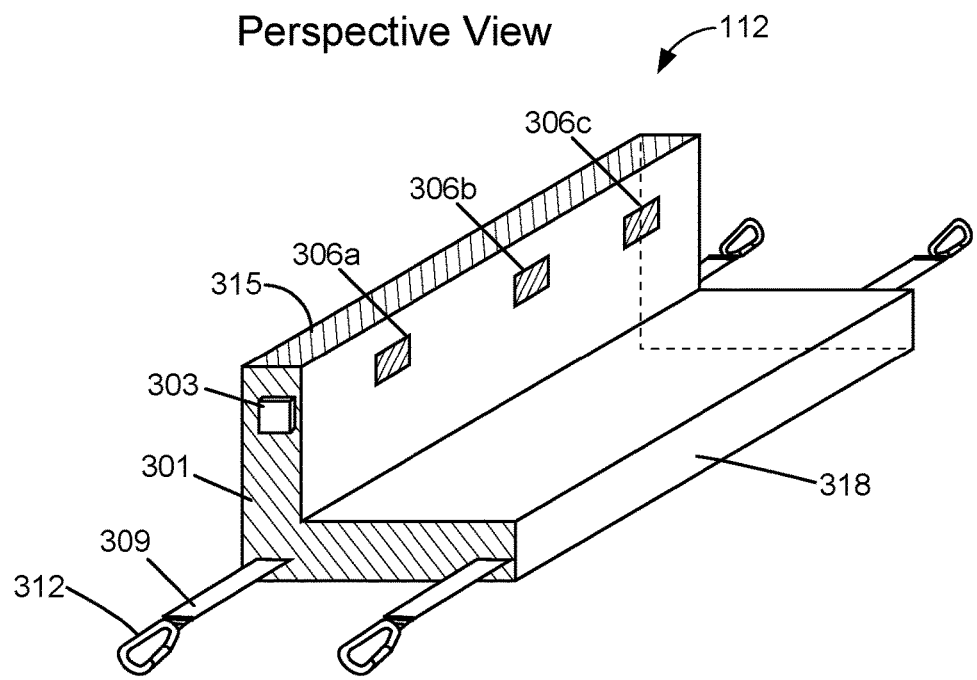
FIGS. 3A through 3C illustrate a perspective view, a side view, and a front view of a sidebar VRS, according to various embodiments of the present disclosure.
Figure 3B:
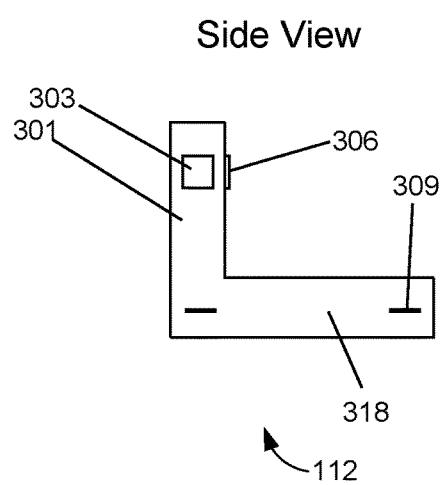
Figure 3C:
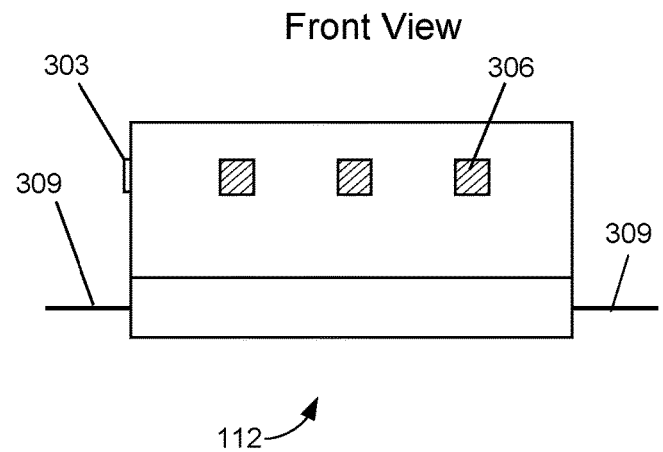
Figure 3D:
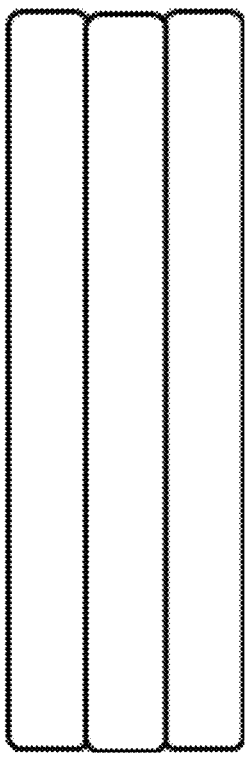
FIG. 3D illustrates a side view of a gas chamber, according to various embodiments of the present disclosure.

Moving on to FIG. 3A, shown is perspective view of the sidebar VRS 112. The sidebar VRS 112 can include a gas chamber 301, an inflation control module 303, a plurality of magnets 306a-306c (collectively "magnets 306"), a snap-hook extended strap 309, and a snap-hook 312. In addition, FIG. 3B illustrates a side view of the sidebar VRS 112 and FIG. 3C illustrates a front view of the sidebar VRS 112. FIG. 3D illustrates a side view of the gas chamber 301. Further, the illustrated embodiment in FIGS. 3A-3C can be representative of the embodiments depicted in FIG. 1A for the sidebar VRS 112, the hood VRS 106, and the trunk VRS 109.

Referring between FIGS. 3A-3D, the gas chamber 301 can have an elongated structure that comprises an upper portion 315, a lower portion 318, and a cavity. The cavity can be filled with a gas from gas tubes located on the inflation control module 303. In one embodiment, among others, the gas chamber 301 can be divided into chamber cells such as, e.g., an outer cell, a middle cell, and an inner cell as illustrated in FIG. 3D. Each of the chamber cells can be completely isolated from each other but attached to each other. Each of the chamber cells can have its own mechanical corridor to allow the gas to enter and inflate the cell. In addition, the inflation control module 303 can sense the pressure in each cell and control the release of gas to any or all of the cells appropriately. The inflation control module 303 can also have similar components as the previously discussed inflation control module 203 (FIG. 2B).

As illustrated, the magnets 306 can be positioned on the upper portion 315 of the gas chamber 301. In other embodiments, the magnets 306 can be positioned at different locations, such as at the lower portion 318 of the gas chamber 301. In addition, one or multiple snap-hook extended straps 309 can be attached to a first end and a second end of the gas chamber 301.

Next, a general description of the operation of the various components of the vehicle rescue system 100 is provided. To begin, the vehicle rescue system 100 can be installed on the vehicle 103. During a flooding scenario, the water can reach a predetermined height that triggers a sensor to transmit an activation signal. The sensor can be attached to one of the inflatable modules or positioned separately at a location on the vehicle 103. In response to the activation signal, the inflatable modules synchronize the release of gas into gas chambers. The gas release inflates the gas chambers, which in turn elevates the vehicle 103. The gas chambers are inflated to such a degree that the inflatable modules enable the vehicle to float on the water.

In another non-limiting example, a client device may be in wireless/Bluetooth communication with one of the inflatable modules. A user operating the client device may wirelessly transmit an activation signal to one of the inflation control modules using a smart phone. In yet another non-limiting example, the inflation control modules can be triggered manually by a user manipulating a gas inflation latch. In these scenarios, a user can activate the inflatable modules in preparation for flooding conditions. The inflation control module will stabilize and control the pressure in each of the chamber cells.

With respect to the tire jacket VRS 115 as shown in FIGS. 2A-2D, it can be installed on a tire of the vehicle 103 by first opening the tire jacket 212 via the zipper snap 236. The tire jacket 212 can be positioned to surround a top portion of the tire. The zipper snap 236 can be manipulated along the path of the jacket zipper 233 to close the tire jacket 212. The snap-hook strap 216 is wrapped around the axle of the vehicle 103 and attached to the ring 239 via the snap-hook 242.

As discussed above, during a flood, the water can reach a predetermined height that triggers one of the sensors. More specifically, the sensor can transmit a wireless/Bluetooth or wired activation signal to the control board 218. The control board 218, in turn, initiates release of the gas from the gas tube 221 (e.g. by activating a release value or a device to break the seal). The gas contained in the gas tube 221 can flow into the tire jacket gas chamber 215. As gas enters, the tire jacket gas chamber 215 can begin to inflate and expand the dimensions of the tire jacket gas chamber 215. In some embodiments, the tire jacket gas chamber 215 can be inflated to such a degree that it could substantially surround the tire of the vehicle 103. As one can appreciate, the tire jacket VRS 115 can be installed on all of the tires of the vehicle 103. When multiple tire jacket VRS 115 are inflated, the tire jacket VRS 115 can enable the vehicle 103 to float by increasing the buoyancy of the vehicle 103. Multiple tire jacket VRS 115 can be connected to other inflatable modules to provide a ring of floatation devices around the vehicle.

In another non-limiting example, a user can use a mobile client device, such as a smartphone, to activate one or multiple tire jacket VRS 115. Particularly, the user can use the mobile client device to wirelessly communicate with the inflation control module 203. The mobile client device can transmit, via a mobile application, a command to the inflation control module 203 to initiate the inflation of the tire jacket VRS 115. After the tire jacket 115 is inflated, it can maintain the air pressure inside to remain inflated.

The tire jacket VRS 115 can be deflated using a mechanical release corridor latch (FIG. 2B). The tire jacket VRS 115 can be ready for reuse with minimum effort. Specifically, in some embodiments, after inflation, the gas tubes 221 can be replaced with new gas tubes containing gas. In other embodiments, the user can replace the inflation control module 203 to prepare the tire jacket VRS 115 for a subsequent inflation.

Next, with respect to the sidebar VRS 112, it can be attached to a lower edge of the vehicle 103 via one or multiple magnets 306 during installation. Specifically, the lower portion 318 can be positioned underneath the vehicle 103, and the upper portion 315 can be positioned along a lower area of the side of the vehicle 103. In some embodiments, one of the snap-hook extended straps 309 can attached to an aperture associated with the structure of the vehicle to reinforce the attachment of the sidebar VRS to the vehicle 103. In some alternative embodiments, the snap-hook extended straps 309 can also be used to connect to another vehicle rescue system, such as the tire jacket VRS 115 (FIG. 2). Similar to the tire jacket VRS, the sidebar 112 can be inflated upon detection of a water threshold, upon receiving a wireless command, or upon manual manipulation by the user.

In addition, the sidebar 112 can be connected to other vehicle rescue systems to form a connected set of inflatable modules. For example, the sidebar VRS 112a can be attached to the tire jacket VRS 115a on the first end of the gas chamber 301 and the tire jacket VRS 115b on the second end of the gas chamber 301. The snap-hook extended strap 309 can be attached to the ring 239 or another location on the tire jacket VRS 115a. In turn, the tire jacket VRS 115a can be attached to the hood VRS 106, and the hood VRS 106 can be attached to the tire jacket VRS 115c. In addition, the tire jacket VRS 115c can be attached to one end of the sidebar VRS 112b and the sidebar VRS 112b can be attached to the tire jacket VRS 115d at the other end. The trunk VRS 109 can be attached the tire jacket VRS 115d at one end and the tire jacket VRS 115b at the other end. In other words, the attached inflatable modules can form a ring underneath and/or along the side of the vehicle 103.

Figure 4A:
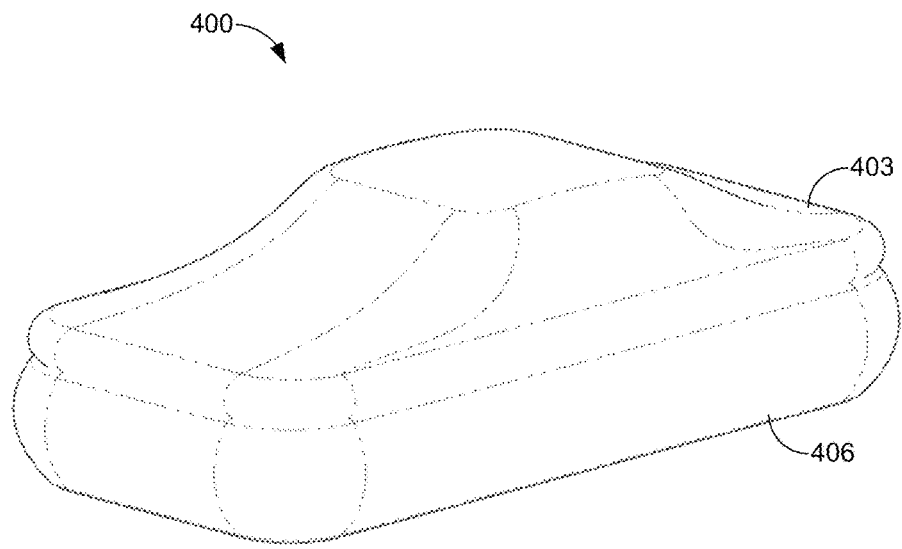
FIG. 4A illustrates a drawing of a protective rescue bag system for a vehicle, according to various embodiments of the present disclosure.

With reference to FIG. 4A, shown is an exemplary illustration of a protective rescue bag system 400. The protective rescue bag system 400 includes a cover 403 and a protective air bag 406. Although not shown, a vehicle is inside the of the protective rescue bag system 400 (See, e.g., 518 in FIG. 6B). The illustrated embodiment in FIG. 4A can be used to protect a vehicle during hazardous weather conditions, such as a flood, a tornado, a hurricane, and other hazardous weather events. As will be described, the protective air bag 406 can inflate to form a protective barrier around and underneath the vehicle. The protective air bag 406 can comprise one or multiple air chambers. The protective air bag 406 can comprise multiple side barriers that are connected to each other. The side barriers can be used for cushioning and protection against collisions with other objects when the vehicle is floating. The cover 403 can also comprise one or multiple air chambers. The cover 403 can be attached to the protective air bag 406. The cover 403 can prevent water from accessing the interior of the protective rescue bag system 400. In some embodiments, the cover 403 can be omitted. In addition, although not shown, the cover 403 and the protective air bag can be attached to an inflation control module 203 (FIG. 2B). As discussed previously, the inflation control module 203 can be used to control the release of a gas from gas tubes 221 into the cover 403 and/or the protective air bag 406.

Figure 4B:
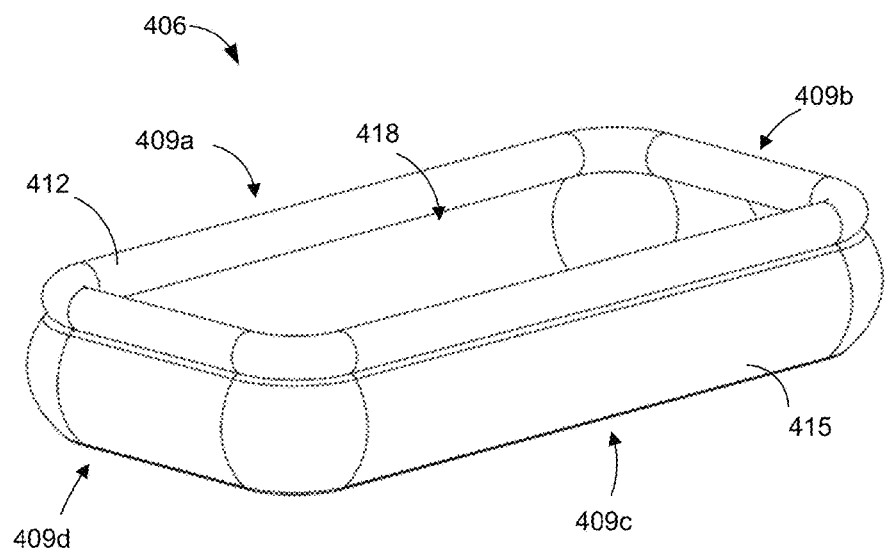
FIG. 4B illustrates a drawing of a protective air bag from FIG. 4A, according to various embodiments of the present disclosure.

Next, turning to FIG. 4B, shown is an illustration of the protective air bag 406 in an inflated state without a vehicle or cover 403. As illustrated in FIG. 4B, the protective air bag 406 comprises a first inflatable barrier 409a, a second inflatable barrier 409b, a third inflatable barrier 409c, and a fourth inflatable barrier 409d (collectively referred to as "barriers 409"). Each barrier 409 can comprise an inflatable barrier rim 412 and an inflatable barrier base 415. The barriers 409 can comprise one or multiple air chambers. In some embodiments, each barrier 409 can comprise multiple air tubes. The air chambers or air tubes can be filled via a single air port. In some embodiments, each air chamber is structurally independent from the other air chambers. As a result, a puncture in one of the air chambers does not cause the other air chambers to deflate. During an inflated state, the barriers 409 can form an inner cavity 418 for a vehicle. The barriers 409 surround the vehicle to protect it from hazardous conditions.

Figure 5A:
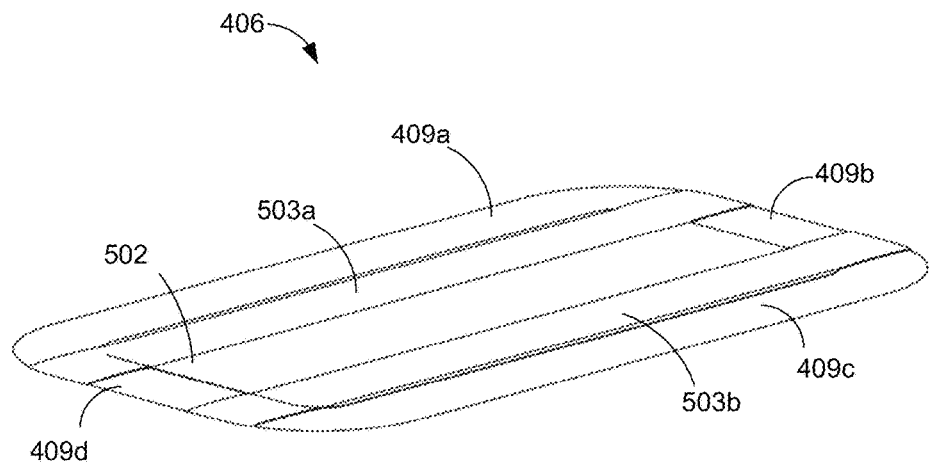
FIGS. 5A through 5C illustrate an exemplary progression for inflating the protective air bag from FIG. 4B, according to various embodiments of the present disclosure.
Figure 5B:
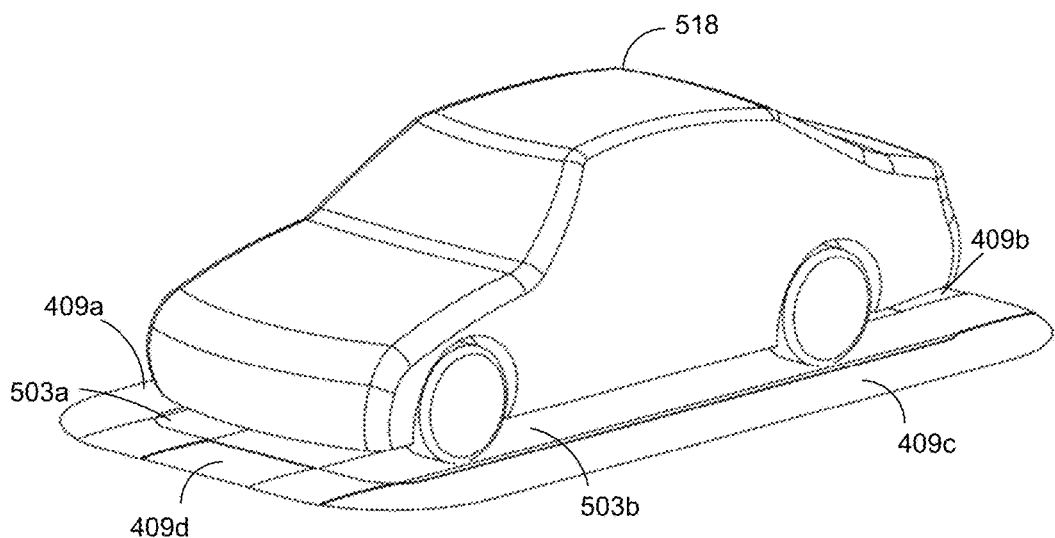
Figure 5C:
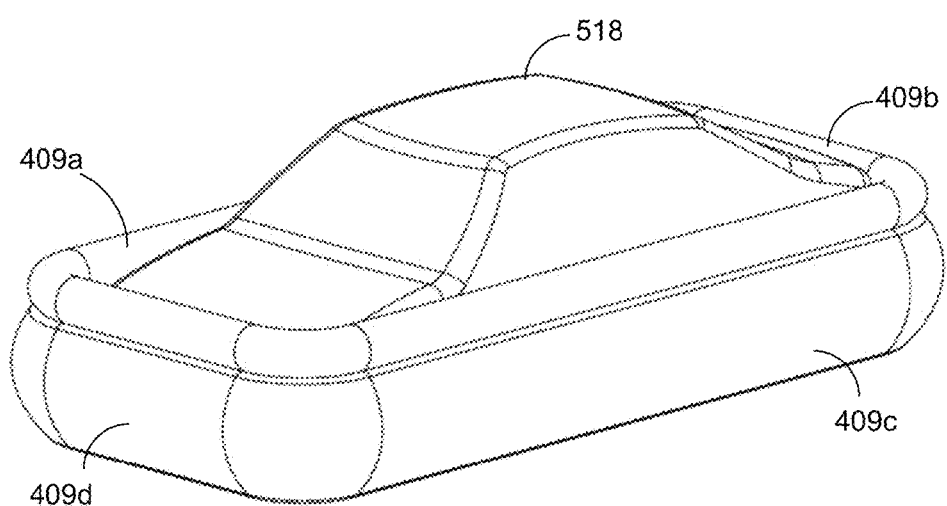

Turning to FIGS. 5A through 5C, shown is a progression for inflating the protective rescue bag system 400 from FIGS. 4A and 4B. Particularly, FIG. 5A illustrates a deflated state of the protective air bag 406 from FIGS. 4A and 4B. FIG. 5A illustrates that the protective air bag 406 can comprise an inflatable base 502. The inflatable base 502 comprises a base air chamber that elevates a vehicle positioned on the inflatable base 502 at an inflated state. Thus, the protective rescue bag system 400 can enable the vehicle to float on water or during hazardous weather conditions, such as floods, mud slides, hurricanes and other weather conditions.

The inflatable base 502 comprises a first material strip 503a and a second material strip 503b (collectively referred to as the "material strips 503"). The material strips 503 can protect the air chambers, particularly the base air chamber, within the protective air bag 406 because the tires of the vehicle can be positioned on the material strips 503. The material strips 503 can comprise a rubber material and other suitable protective materials.

Referring to FIG. 5B, shown is another step in an exemplary progression for inflating the protective air bag 406 around a vehicle 518. In FIG. 5B, the tires of the vehicle 518 are positioned on the material strips 503. In some scenarios, the vehicle 518 can be rolled onto the material strips 503 while the protective air bag 406 is in a deflated state. In some embodiments, the material strips 503 can have visual guide markings to indicate a location for the tires of the vehicle 518 to be positioned. In other embodiments, the material strips 503 can comprise raised protrusions to indicate positioning for the tires of the vehicle 518. In some embodiments, the protective air bag 406 can comprises straps, synch cords, ratchet straps, and other suitable fasteners for securing the vehicle 518 to the protective air bag 406. For example, a first end of a strap can be attached to an interior surface of the protective air bag 406. A second end of the strap can be attached to an underside of the vehicle 518, a tire of the vehicle 518, and/or other suitable locations around the vehicle 518. In addition, the straps can be used to make the protective air bag 406 fit more securely to the vehicle 518. Referring to FIG. 5C, shown is another step in an exemplary progression for inflating the protective air bag 406 around the vehicle 518. In FIG. 5C, the protective air bag 406 is inflated around the vehicle 518.

FIG. 5A through FIG. 5C also illustrate different exemplary steps for inflating the protective air bag 406. As a non-limiting example, an operator can lay out the protective air bag 406 on the ground, as shown in FIG. 5A. The vehicle 518 can be positioned on top of the protective air bag 406, particularly the tires of the vehicle 518 can be positioned on top of the material strips 503 as shown in FIG. 5B. Visual markings or raised protrusions on the inflatable base 502 can be used to guide the positioning of the vehicle 518. The protective air bag 406 can be secured to the vehicle 518 by way of one or multiple straps. For example, straps attached to the inflatable base 502 or an inner surface of the barriers 409 can be attached to a tire, an axis, and/or other suitable locations for the vehicle 518.

Next, the inflation of the protective rescue bag system 400 can be initiated. The protective rescue bag system 400 can initiate inflation by way of the inflation control module 203. In some embodiments, the protective rescue bag system 400 can comprise sensors that are attached to the surface of the barriers 409, the inflatable base 502, and other suitable locations on the protective rescue bag system 400. The sensors can detect the presence of the vehicle 518 on the inflatable base 502. The sensors can transmit an activation signal to the inflation control module 203, which in turn can initiate the release of gas into the cover 403 and the protective air bag 406. In other embodiments, the inflation control module 203 can be triggered manually or by a remote control. Subsequently, the cover 403 can be placed over the vehicle 518, as shown in FIG. 4A. Additional straps can be used to secure the cover 403 to the barriers 409.

Figure 6A:
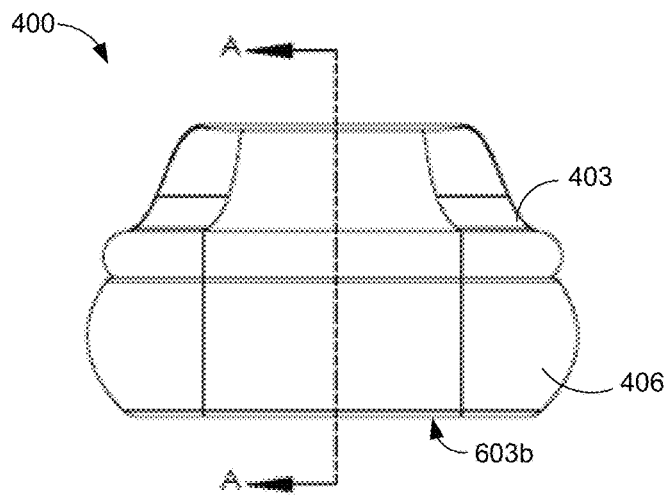
FIG. 6A is a drawing of a side view of the protective rescue bag system from FIG. 4A, according to various embodiments of the present disclosure.

With reference to FIG. 6A, shown is a front/rear view of the protective rescue bag system 400 from FIG. 4A. FIG. 6A includes a cross-sectional reference "A-A" indication for FIG. 6B. As illustrated in FIG. 6A, the barriers 409 of the protective air bag 406 expand during inflation and form a curved surface. The barriers 409 can provide cushioning and prevent damage to the vehicle 518 when the protective air bag 406 strikes objects, particularly when the protective rescue bag system 400 is afloat. The inflatable base 502 can comprise a heat-resistant surface 603a on a top surface that is accessible from the interior of the protective air bag 406. In some embodiments, the inflatable base 502 can have a heat-resistant surface 603b on a bottom surface that is exposed to the exterior. The heat-resistant top surface 603a can be used to prevent damage to aspects of the protective air bag 406 that come into contact with high temperature components of the vehicle 518 or exhaust fumes from the vehicle. In addition, the protective air bag 406 can comprise tethers to tie the protective air bag 406 to a stationary object. This prevents the protective rescue system 403 from drifting away in a flood scenario.

Figure 6B:
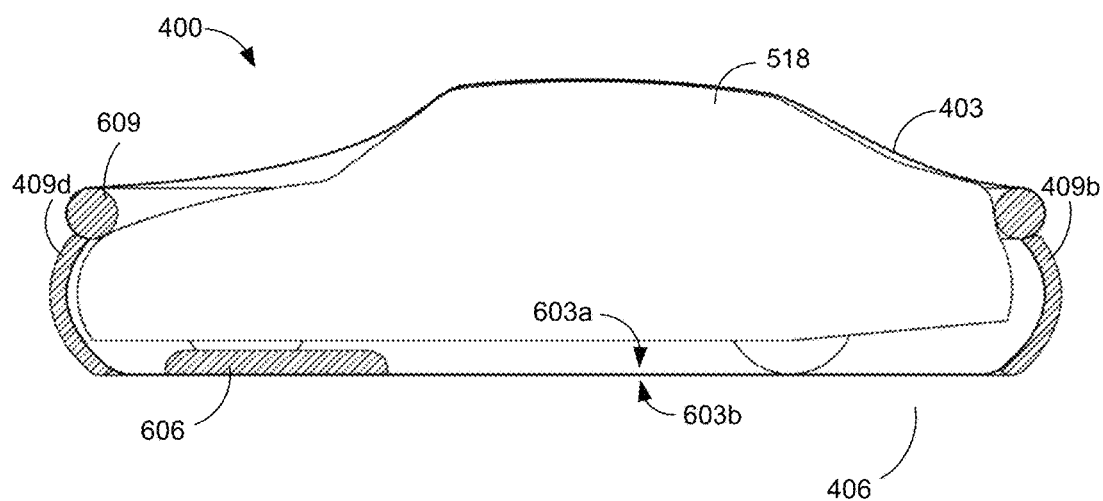
FIG. 6B is a drawing of a cross-sectional view of the protective rescue bag system from FIG. 6A, according to various embodiments of the present disclosure.

Turning to FIG. 6B, shown is a cross-sectional view of FIG. 6A indicated by the "A-A" reference. FIG. 6B illustrates that the protective air bag 406 can comprise an under-vehicle air bag 606. The under-vehicle air bag 606 can be attached to the inflatable base 406. In addition, the under-vehicle air bag 606 can comprise one or multiple air chambers. When inflated, the under-vehicle air bag 606 can expand to a height higher than other aspects of the inflatable base 502. The under-vehicle air bag 606 can be positioned under particular portions of the vehicle 518 to facilitate a better distribution of the weight of the vehicle during floatation. As a result, the under-vehicle air bag 606 can enable the protective air bag 406 to float more evenly. For example, an engine of the vehicle 518 can be positioned above the under-vehicle air bag 606. In this non-limiting example, the under-vehicle air bag 606 can compensate for the additional weight of the engine. Further, FIG. 6B illustrates that the cover 403 can comprise a cover perimeter 609 that includes one or multiple air chambers.

In addition, FIG. 6B illustrates that the inflatable barriers 409b, 409d substantially wrap around portions of the vehicle 518. For example, the inflatable barrier 409d wraps around a portion of a front bumper of the vehicle 518, and the inflatable barrier 409b wraps around a portion of a rear bumper of the vehicle 518. During an inflated state, the inflatable barriers 409 can elevate and substantially conform to a contour of the vehicle 518. For example, as water rises around the protective air bag 406, the barriers 409 can elevate and move inward toward the interior of the protective air bag 406. Particularly, the filled air chambers of the barriers 409 can elevate and surround the vehicle 518. This elevation of the barriers 409 can enable the mass of the vehicle 518 to become lower with respect to the buoyancy of the vehicle 518. As a result, the barriers 409 can adjust to conform to the shape of the vehicle 518, which can increase the stability of the vehicle 518 while floating. In addition, as the barriers 409 elevate and move inward, substantially all voids between the vehicle 518 and the inner surfaces of the barriers 409 are substantially eliminated.

Figure 7:
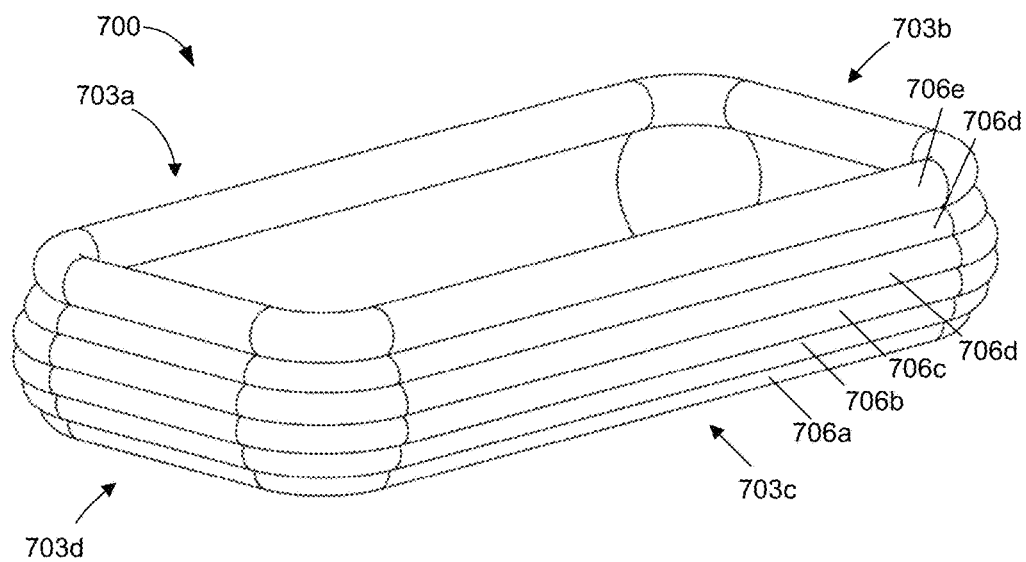
FIG. 7 is a drawing of a perspective view of a multi-tube protective air bag, according to various embodiments of the present disclosure.

With reference to FIG. 7, shown is a perspective view of a multi-tube protection air bag 700. The multi-tube protection air bag 700 is an alternative embodiment of the protection air bag 406 shown in FIG. 4B. FIG. 7 illustrates that the multi-tube protection air bag 700 comprises a first inflatable barrier 703a, a second inflatable barrier 703b, a third inflatable barrier 703c, and a fourth inflatable barrier 703d (collectively "inflatable barriers 703." Each inflatable barrier 703 can comprise multiple barrier tubes 706a-706e (collective "barrier tubes 706"). Each barrier tube 706 can comprise one or multiple air chambers. Further, each barrier tube 706 can be structurally independent, such that the failure of one of the barrier tubes 706 does not deflate the air chambers of the other barrier tubes 706. The constrained air volume in the barrier tubes 706 creates a protective "bumper" around the perimeter of the vehicle 518 for incidental collision protection while floating. In one embodiment, among others, the multi-tube protection air bag 700 has many chambers for each barrier tube 706. In some embodiments, the inflatable barrier 703 can have a protective cover over the barrier tubes 706. For example, the protective cover can appear similar to the inflatable barrier base 415 shown in FIG. 4B.

Figure 8:
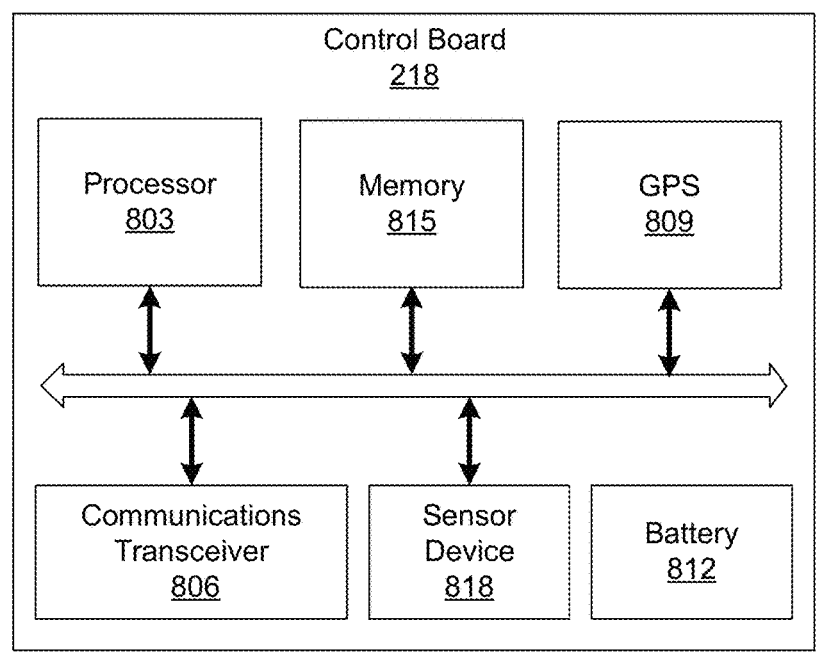
FIG. 8 is a block diagram illustrating an example of a control board, according to various embodiments of the present disclosure.

With reference to FIG. 8, shown is a block diagram of an example of the control board 218. The control board 218 can include various electronic components such as a processor 803, a communications transceiver 806, a global positioning system (GPS) receiver 809, a battery 812, a memory 815, a sensor device 818, and other suitable electronic components, such as pressure sensors.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, the following is claimed:

1. A vehicle rescue system, comprising:
    a gas chamber configured to attach to a vehicle, the gas chamber comprising an enclosed cavity and a port;
    a gas tube connected to the gas chamber via the port, the gas tube being filled with a gas; and
    an inflation control module attached to the gas chamber, the inflation control module being configured to control a release of the gas from the gas tube into the gas chamber through the port, wherein releasing the gas inflates the gas chamber,
    wherein the inflation control module includes a wireless transceiver that receives a wireless signal to control the release of the gas from the gas tube.

2. The vehicle rescue system of claim 1, wherein the gas chamber is configured to attach to the vehicle via a plurality of magnets attached to the gas chamber.

3. The vehicle rescue system of claim 1, wherein the gas chamber comprises an elongated gas chamber, and wherein a first portion of the elongated gas chamber is configured to be positioned underneath the vehicle and a second portion of the elongated gas chamber is configured to be positioned along a side of the vehicle.

4. The vehicle rescue system of claim 1, wherein the gas chamber comprises a plurality of snap-hook straps attached to the gas chamber, wherein at least one of the plurality of snap-hook straps is configured to attach to another gas chamber.

5. The vehicle rescue system of claim 1, wherein the inflation control module initiates a release the gas into the gas chamber in response to at least one of: a detection of a liquid level threshold, a wireless signal from a client device, or a user manipulation of a chamber inflation latch.

6. A tire vehicle rescue system, comprising:
    a tire jacket configured to surround a portion of a tire of a vehicle;
    a gas chamber attached to the tire jacket, the gas chamber comprising a cavity;
    a strap attached to the tire jacket, the strap configured to wrap around an axle of the vehicle from a first end of the tire jacket to a second end of the tire jacket; and
    an inflation control module that is attached to the gas chamber, the inflation control module comprising a gas tube containing a gas, the inflation control module being configured to control a release of the gas from the gas tube into the gas chamber, wherein releasing the gas inflates the gas chamber.

7. The tire vehicle rescue system of claim 6, wherein the strap is a snap-hook strap, and wherein the snap-hook strap is attached to a ring connected to the second end of the tire jacket.

8. The tire vehicle rescue system of claim 6, wherein the gas contained in the gas tube is air, nitrogen, or carbon dioxide.

9. The tire vehicle rescue system of claim 6, wherein the inflation control modules comprise a manual gas release latch.

10. The tire vehicle rescue system of claim 6, wherein the tire jacket surrounds a top half of the tire.

11. The tire vehicle rescue system of claim 6, further comprising an enclosure that conceals the inflation control module, wherein the enclosure prevents water from accessing the inflation control module.

12. A vehicle rescue system, comprising:
    a first inflatable side module and a second inflatable side module configured to attach to a vehicle, the first inflatable side module and the second inflatable side module comprising an elongated gas chamber, the first inflatable side module and the second inflatable side module being configured to elevate a portion of the vehicle in response to inflating the elongated gas chamber;
    a plurality of inflatable tire modules configured to attach to a plurality of vehicle tires, wherein the first inflatable side module and the second inflatable side module are attached to at least one of the plurality of inflatable tire modules, and
    wherein each of the plurality of inflatable tire modules comprises a gas chamber, wherein the plurality of inflatable tire modules are configured to elevate a portion of the vehicle in response to inflating the gas chamber, wherein, when the gas chamber or the elongated gas chamber is inflated, the vehicle floats in water.

13. The vehicle rescue system of claim 12, further comprising an anchor module that is attached to the first inflatable side module or the second inflatable side module, wherein the anchor module is configured to release an anchor in response to receiving an activation signal or manual manipulation of a lever.

14. The vehicle rescue system of claim 12, further comprising an inflatable front bumper module attached to two of the plurality of inflatable tire modules.

15. The vehicle rescue system of claim 12, further comprising an inflatable rear bumper module attached to two of the plurality of inflatable tire modules.

16. A vehicle protection system, comprising:
 a plurality of inflatable barriers that surround a vehicle in an inflated state, each inflatable barrier being attached to at least two of the plurality of inflatable barriers, each inflatable barrier comprising at least one air chamber, the at least one air chamber for each of the plurality of inflatable barriers being structurally independent; and
 an inflatable base that is attached to the plurality of inflatable barriers, the inflatable base comprising a base air chamber, the inflatable base being configured to elevate a portion of the vehicle in response to inflating the base air chamber.

17. The vehicle protection system of claim 16, wherein the inflatable base comprises at least two material strips that are used as a location for a plurality of tires of the vehicle.

18. The vehicle protection system of claim 16, further comprising a cover that attaches to the inflatable barriers, wherein the cover is positioned over the vehicle.

19. The vehicle protection system of claim 16, further comprising a single air port that fills the at least one air chamber of the plurality of inflatable barriers and the base air chamber of the inflatable base.

20. The vehicle protection system of claim 16, wherein the inflatable base comprises a heat-resistant material.

* * * * *